(12) United States Patent
Ozasa et al.

(10) Patent No.: US 12,224,130 B2
(45) Date of Patent: Feb. 11, 2025

(54) FILM CAPACITOR

(71) Applicant: Murata Manufacturing Co., Ltd., Nagaokakyo (JP)

(72) Inventors: Senichi Ozasa, Nishinomiya (JP); Kimiaki Kikuchi, Nishinomiya (JP); Satoru Jogan, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 754 days.

(21) Appl. No.: 17/389,997

(22) Filed: Jul. 30, 2021

(65) Prior Publication Data

US 2021/0358693 A1    Nov. 18, 2021

Related U.S. Application Data

(63) Continuation of application No. PCT/JP2019/044694, filed on Nov. 14, 2019.

(30) Foreign Application Priority Data

Feb. 7, 2019   (JP) ................................ 2019-020504

(51) Int. Cl.
*H01G 4/32* (2006.01)
*H01G 4/005* (2006.01)
*H01G 4/018* (2006.01)
*H01G 4/33* (2006.01)

(52) U.S. Cl.
CPC ............... *H01G 4/32* (2013.01); *H01G 4/005* (2013.01); *H01G 4/018* (2013.01); *H01G 4/33* (2013.01)

(58) Field of Classification Search
CPC ............ H01G 4/32; H01G 4/33; H01G 4/005; H01G 4/18

USPC ..................... 361/301.4, 301.5, 303, 321.1
See application file for complete search history.

(56) References Cited

U.S. PATENT DOCUMENTS

2011/0310527 A1   12/2011   Hioki et al.

FOREIGN PATENT DOCUMENTS

| JP | S60116226 U | 8/1985 |
|----|-------------|--------|
| JP | S64323 U | 1/1989 |
| JP | H02106912 A | 4/1990 |
| JP | H0723953 Y2 | 5/1995 |
| JP | 2010040573 A * | 2/2010 |
| JP | 2013247264 A * | 12/2013 |

(Continued)

OTHER PUBLICATIONS

International Search Report issued for PCT/JP2019/044694, date of mailing Jan. 28, 2020.

(Continued)

*Primary Examiner* — Arun Ramaswamy
(74) *Attorney, Agent, or Firm* — ArentFox Schiff LLP (57) ABSTRACT

A film capacitor that includes a capacitor element including one or more wound or laminated metallized films, each metallized film including a dielectric resin film and a metal layer on one surface of the dielectric resin film; a cover covering an outer surface of the capacitor element in a direction in which layers of the dielectric resin film are laminated with the metal layer therebetween; and an exterior body covering an outer periphery of the capacitor element and an outer surface of the cover. In a first aspect, the dielectric resin film contains a curable resin as a main component thereof, and the cover is made of a thermoplastic resin.

25 Claims, 3 Drawing Sheets

(56) References Cited

FOREIGN PATENT DOCUMENTS

| JP | 2016157755 A | * | 9/2016 |
| JP | 2016219752 A | | 12/2016 |
| JP | 2017010980 A | | 1/2017 |
| WO | 2010101170 A1 | | 9/2010 |

OTHER PUBLICATIONS

Written Opinion of the International Searching Authority issued for PCT/JP2019/044694, date of mailing Jan. 28, 2020.

* cited by examiner

FILM CAPACITOR

CROSS REFERENCE TO RELATED APPLICATIONS

The present application is a continuation of International application No. PCT/JP2019/044694, filed Nov. 14, 2019, which claims priority to Japanese Patent Application No. 2019-020504, filed Feb. 7, 2019, the entire contents of each of which are incorporated herein by reference.

FIELD OF THE INVENTION

The present invention relates to a film capacitor.

BACKGROUND OF THE INVENTION

One type of capacitor is a film capacitor including a flexible resin film as a dielectric, a first counter electrode, and a second counter electrode opposing the first counter electrode across the resin film. Usually, a capacitor element of the film capacitor has a substantially cylindrical shape obtained by winding a resin film serving as dielectric. The cylinder has a first end surface and a second end surface opposing each other and including a first external electrode and a second external electrode, respectively. The first counter electrode is electrically connected to the first external electrode, and the second counter electrode is electrically connected to the second external electrode.

Examples of the dielectric resin film defining the capacitor element include one disclosed in Patent Literature 1 which contains a thermosetting resin as a main component. According to Patent Literature 1, a capacitor element including a dielectric resin film containing a thermosetting resin as a main component has higher heat resistance than a capacitor element including a dielectric resin film containing a thermoplastic resin such as polypropylene as a main component.

Patent Literature 1: WO 2010/101170

SUMMARY OF THE INVENTION

Figure 7:
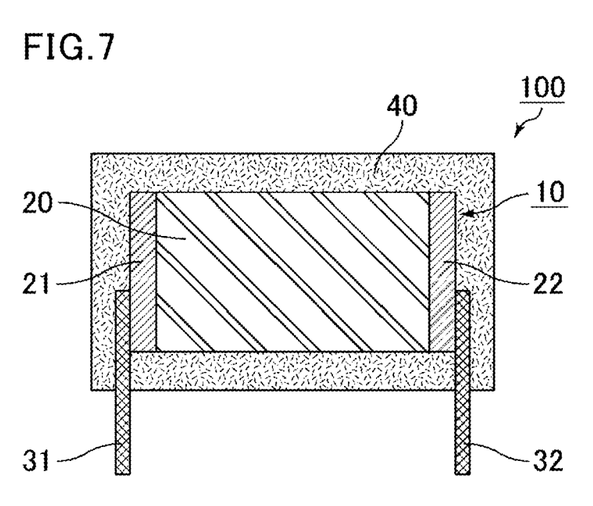
FIG. 7 is a schematic cross-sectional view of an example of a conventional film capacitor.

FIG. 7 is a schematic cross-sectional view of an example of a conventional film capacitor.

A film capacitor 100 shown in FIG. 7 includes a capacitor element 10. The capacitor element 10 includes a wound body 20 of metallized films, and a first external electrode 21 and a second external electrode 22 on both sides of the wound body 20. A first lead 31 is electrically connected to the first external electrode 21, and a second lead 32 is electrically connected to the second external electrode 22. The film capacitor 100 further includes an exterior resin 40 covering an outer periphery of the capacitor element 10.

The exterior resin of the film capacitor is usually a thermosetting resin such as an epoxy resin, or a resin case filled with a thermosetting resin such as an epoxy resin. A resin such as polyphenylene sulfide is typically used as a material of the resin case.

A film capacitor having high heat resistance as disclosed in Patent Literature 1 is used in an environment with high temperature fluctuations, ranging from room temperature to a high temperature close to 125° C. Repeated thermal shock to the film capacitor results in higher equivalent series resistance (ESR) in some cases.

The present invention was made to solve the above issues and aims to provide a film capacitor capable of suppressing the increase in the ESR even when used repeatedly in a high temperature range.

The present inventors assumed that the increase in the ESR can be suppressed by alleviating thermal shock due to thermal conduction and/or thermal expansion between the capacitor element and the exterior body, and completed the present invention.

A film capacitor of the present invention includes a capacitor element including one or more wound or laminated metallized films, each metallized film including a dielectric resin film and a metal layer on one surface of the dielectric resin film, a cover covering an outer surface of the capacitor element in a direction in which layers of the dielectric resin film are laminated with the metal layer therebetween, and an exterior body covering an outer periphery of the capacitor element and an outer surface of the cover.

In a first aspect, the dielectric resin film contains a curable resin as a main component thereof, and the cover is made of a thermoplastic resin.

In a second aspect, the cover has an elastic modulus at 25° C. of 30% to 150% of an elastic modulus of the dielectric resin film at 25° C., and the cover has an elastic modulus at 125° C. of 1% to 30% of an elastic modulus of the dielectric resin film at 125° C.

In a third aspect, the cover is a wound film that is a film wound around the outer surface of the capacitor element, and the wound film has at least one roughened surface or has irregularities on opposed surfaces thereof.

In a fourth aspect, the cover is a coating on the outer surface of the capacitor element, and the coating has air bubbles contained therein.

The present invention provides a film capacitor capable of suppressing the increase in the ESR even when used repeatedly in a high temperature range.

DETAILED DESCRIPTION OF THE PREFERRED EMBODIMENTS

The film capacitor of the present invention is described below.

The present invention is not limited to the following preferred embodiments, and may be suitably modified without departing from the gist of the present invention.

Combinations of two or more preferred features described in the following preferred features are also within the scope of the present invention.

The film capacitor of the present invention includes a capacitor element including one or more wound or laminated metallized films, each metallized film including a dielectric resin film and a metal layer on one surface of the dielectric resin film, a cover covering an outer surface of the capacitor element in a direction in which layers of the dielectric resin film are laminated with the metal layer therebetween, and an exterior body covering an outer periphery of the capacitor element including an outer surface of the cover.

In the film capacitor of the present invention, preferably, the dielectric resin film contains a curable resin as a main component thereof, and the cover is made of a thermoplastic resin.

Thermoplastic resins have lower thermal conductivity and lower elastic modulus at high temperatures than thermosetting resins. Thus, interposition of a cover made of a thermoplastic resin between the capacitor element and the exterior body interferes with heat transfer between the capacitor element and the exterior body and can reduce thermal expansion stress. This can alleviate thermal shock imparted between the capacitor element and the exterior body, which can suppress the increase in the ESR.

In the direction in which the layers of the dielectric resin film are laminated, preferably, the cover has a thickness that is 0.5% or more of a thickness of the capacitor element. A thicker cover can more significantly alleviate thermal shock imparted between the capacitor element and the exterior body. Meanwhile, a thicker cover results in a larger film capacitor. Thus, in the direction in which the layers of the dielectric resin film are laminated, preferably, the cover has a thickness that is 5% or less of the thickness of the capacitor element.

The thickness of the cover can be measured by an optical film thickness gauge.

Hereinafter, an embodiment of the film capacitor of the present invention is described, taking a wound film capacitor including a first metallized film and a second metallized film that are wound in a laminate state as an example.

The film capacitor of the present invention may be a laminated film capacitor including a first metallized film and a second metallized film that are laminated.

The following preferred embodiments are examples, and features of different preferred embodiments can be partially exchanged or combined with each other. In the second preferred embodiment and subsequent preferred embodiments, descriptions of features common to the first preferred embodiment are omitted and only different points are described. In particular, similar advantageous effects by similar features are not mentioned in each preferred embodiment.

First Embodiment

In a film capacitor according to a first embodiment of the present invention, a cover is a wound film that is a film wound around an outer surface of a capacitor element.

Figure 1:
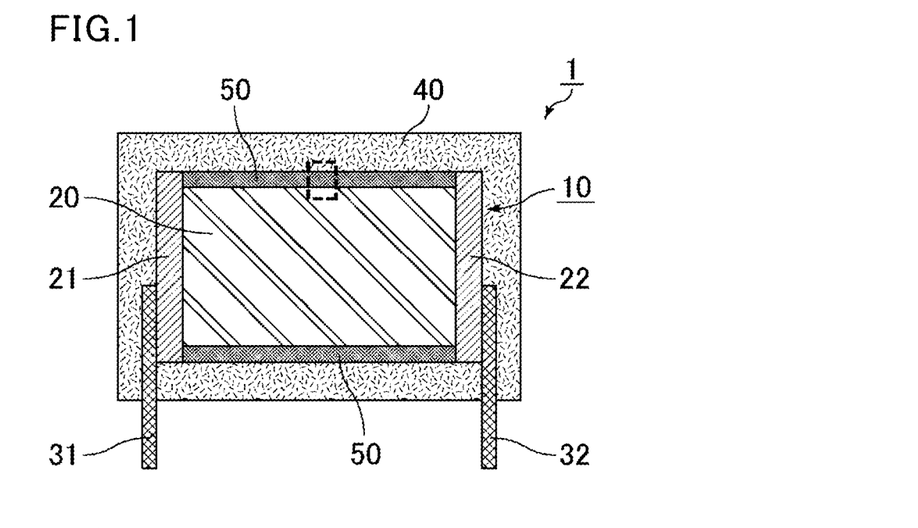
FIG. 1 is a schematic cross-sectional view of an example of a film capacitor according to a first embodiment of the present invention.

FIG. 1 is a schematic cross-sectional view of an example of the film capacitor according to the first embodiment of the present invention.

A film capacitor 1 shown in FIG. 1 includes the capacitor element 10. The capacitor element 10 includes the wound body 20 of metallized films, and the first external electrode 21 and the second external electrode 22 on both sides of the wound body 20. As described later, the wound body 20 includes a first metallized film including a first dielectric resin film and a first metal layer on one surface of the first dielectric resin film and a second metallized film including a second dielectric resin film and a second metal layer on one surface of the second dielectric resin film, and the first metallized film and the second metallized film are wound in a laminated state. The first lead 31 is electrically connected to the first external electrode 21, and the second lead 32 is electrically connected to the second external electrode 22.

The film capacitor 1 shown in FIG. 1 further includes a wound film 50 that is an example of the cover and the exterior resin 40 that is an example of the exterior body. The wound film 50 is wound around an outer surface of the capacitor element 10, and covers the outer surface of the capacitor element 10 in a direction in which the dielectric resin films are laminated with a metal layer therebetween. The exterior resin 40 covers the outer periphery of the capacitor element 10 including an outer surface of the wound film 50.

Figure 2:
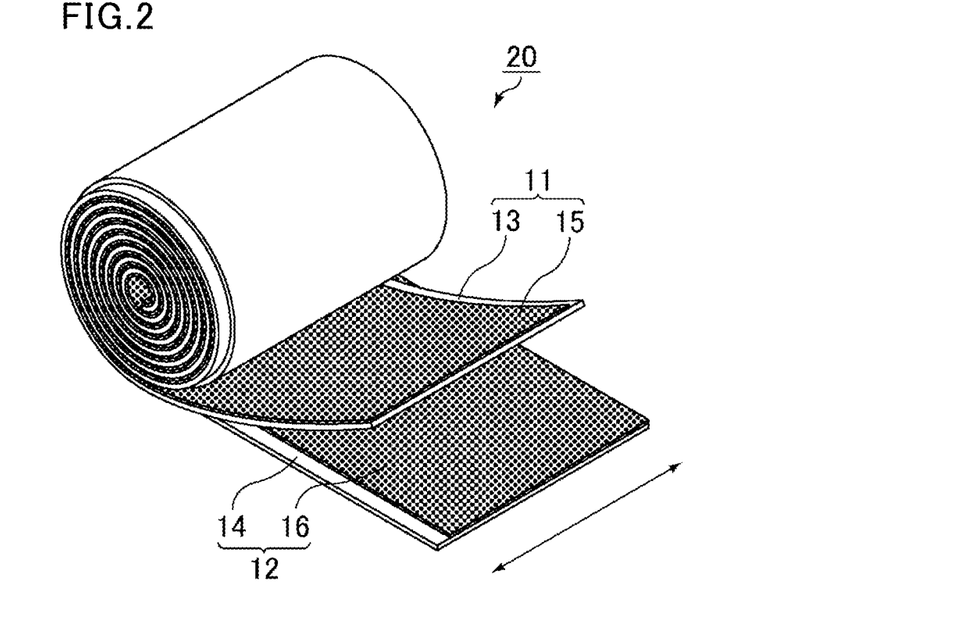
FIG. 2 is a schematic perspective view of an example of a wound body of metallized films defining a capacitor element.

FIG. 2 is a schematic perspective view of an example of the wound body of metallized films defining the capacitor element.

In the wound body 20 of the metallized films shown in FIG. 2, a first metallized film 11 and a second metallized film 12 are wound in a laminated state. The first metallized film 11 includes a first dielectric resin film 13 and a first metal layer (counter electrode) 15 on one surface of the first dielectric resin film 13. The second metallized film 12 includes a second dielectric resin film 14 and a second metal layer (counter electrode) 16 on one surface of the second dielectric resin film 14.

As shown in FIG. 2, the first metal layer 15 and the second metal layer 16 oppose each other with the first dielectric resin film 13 or the second dielectric resin film 14 therebetween. Although not shown in FIG. 2, the first metal layer 15 is electrically connected to the first external electrode 21, and the second metal layer 16 is electrically connected to the second external electrode 22.

The first dielectric resin film 13 and the second dielectric resin film 14 may have different configurations, but preferably, they have the same configuration.

The first metal layer 15 is formed on one surface of the first dielectric resin film 13 such that it extends to a first end but not to a second end. The second metal layer 16 is formed on one surface of the second dielectric resin film 14 such that it extends to the second end but not to the first end. The first metal layer 15 and the second metal layer 16 are aluminum layers, for example.

The first dielectric resin film 13 and the second dielectric resin film 14 are laminated in a displaced relationship from each other in a width direction (a direction indicated by an arrow in FIG. 2) such that one end of the first metal layer 15 which extends to the periphery of the first dielectric resin film 13 and one end of the second metal layer 16 which extends to the periphery of the second dielectric resin film 14 are both exposed from the laminate of the films. As shown in FIG. 2, the first dielectric resin film 13 and the second dielectric resin film 14 are wound in a laminated state into the wound body 20 of the metallized films. The first metal layer 15 and the second metal layer 16 are laminated while they maintain a state in which one end of the first metal layer 15 and one end of the second metal layer 16 are exposed.

In FIG. 2, the first dielectric resin film 13 and the second dielectric resin film 14 are wound such that the second dielectric resin film 14 is outside the first dielectric resin film 13 and that the first metal layer 15 and the second metal layer 16 face inside.

Preferably, the wound body 20 of the metallized films is pressed into a flat shape having an oval or oblong cross-section, so that the wound body 20 has a more compact shape than a wound body having a perfectly circular cross-section. The wound body 20 of the metallized films may include a cylindrical winding shaft. The winding shaft is arranged on the central axis of the metallized films in a wound state, and serves as a spool for winding the metallized films.

The first external electrode 21 and the second external electrode 22 are formed by, for example, thermally spraying zinc or the like onto both end surfaces of the wound body 20 of the metallized films obtained as described above. The first external electrode 21 is in contact with the exposed end of the first metal layer 15, and is thus electrically connected to the first metal layer 15. The second external electrode 22 is in contact with the exposed end of the second metal layer 16, and is thus electrically connected to the second metal layer 16.

In the first embodiment of the present invention, the dielectric resin films defining the capacitor element contain a curable resin as a main component thereof.

The term "main component" as used herein refers to a component with the highest weight percentage, and preferably refers to a component whose weight percentage is more than 50 wt %. Thus, the dielectric resin film may contain other components in addition to the main component. Examples of the other components include additives such as a silicone resin, and uncured residues of starting materials such as a first organic material and a second organic material which are described later.

The curable resin may be a thermosetting resin or a photocurable resin.

The term "thermosetting resin" as used herein refers to a heat-curable resin, and the curing method is not limited. Thus, the thermosetting resin encompasses a resin cured by a method other than heat (such as light or electron beam) as long as the resin is heat curable. Some materials may start a reaction due to their own reactivity. The thermosetting resin also includes such materials that do not necessarily require external heat, light, or the like to start curing. The same applies to the photocurable resins, and the curing method is not limited.

The curable resin may or may not contain at least one of a urethane bond or a urea bond.

The presence of a urethane bond and/or a urea bond can be confirmed using a Fourier transform infrared (FT-IR) spectrophotometer.

Preferably, the dielectric resin films are made of a cured product of the first organic material and the second organic material. Examples thereof include a cured product obtained by a reaction between a hydroxy group (OH group) of the first organic material and an isocyanate group (NCO group) of the second organic material.

When a cured product is obtained by the above reaction, the resulting films may contain uncured residues of the starting materials. For example, the dielectric resin films may contain at least one of an isocyanate group or a hydroxy group. In this case, the dielectric resin films may contain either one or both of an isocyanate group and a hydroxy group.

The presence of an isocyanate group and/or a hydroxy group can be confirmed using a Fourier transform infrared (FT-IR) spectrophotometer.

Preferably, the first organic material is a polyol having two or more hydroxy groups in the molecule. Examples of the polyol include polyvinyl acetals such as polyvinyl acetoacetal, polyether polyols such as a phenoxy resin, and polyester polyols. The first organic material may be any combination of two or more organic materials.

The second organic material is preferably an isocyanate compound, an epoxy resin, or a melamine resin having two or more functional groups in the molecule. The second organic material may be any combination of two or more organic materials.

Examples of the isocyanate compound include aromatic polyisocyanates such as diphenylmethane diisocyanate (MDI) and tolylene diisocyanate (TDI); and aliphatic polyisocyanates such as hexamethylene diisocyanate (HDI). Examples may also include modified products of these polyisocyanates, such as a modified product containing carbodiimide or urethane, for example.

Any epoxy resin may be used as long as it is a resin having an epoxy ring. Examples thereof include bisphenol A epoxy resins, epoxy resins having a biphenyl skeleton, epoxy resins having a cyclopentadiene skeleton, and epoxy resins with a naphthalene skeleton.

Any melamine resin may be used as long as it is an organic nitrogen compound having a triazine ring at the center of the structure and three amino groups around the triazine ring. Examples thereof include alkylated melamine resin. Examples may also include modified products of melamine.

Preferably, the dielectric resin films are obtained by molding a resin solution containing the first organic material and the second organic material into films and curing the films by heat treatment.

The dielectric resin films may contain additives that provide other functions. For example, addition of a leveling agent can provide smoothness. A more preferred additive is a material having a functional group that reacts with a hydroxy group and/or an isocyanate group, which forms part of the crosslinked structure of the cured product. Examples of such a material include a resin having at least one functional group selected from the group consisting of an epoxy group, a silanol group, and a carboxy group.

The dielectric resin films may include a vapor-deposited polymer film as a main component thereof. The term "vapor-deposited polymer film" refers to a film formed by vapor deposition polymerization. In principle, the curable resin includes such a film.

The dielectric resin films may have any thickness, but the thickness is preferably 0.5 μm to 5 μm.

The thickness of the dielectric resin films can be measured by an optical film thickness gauge.

The metal layers defining the capacitor element may contain any metal, but preferably, the metal layers contain at least one selected from the group consisting of aluminum (Al), titanium (Ti), zinc (Zn), magnesium (Mg), tin (Sn), and nickel (Ni).

The metal layers may have any thickness, but in view of reducing or preventing damage to the metal layers, the thickness of each metal layer is preferably 5 nm to 40 nm.

The thickness of each metal layer can be determined by observing a cross-section obtained by cutting the metallized films in a thickness direction, using an electronic microscope such as a field emission scanning electron microscope (FE-SEM).

Figure 6:
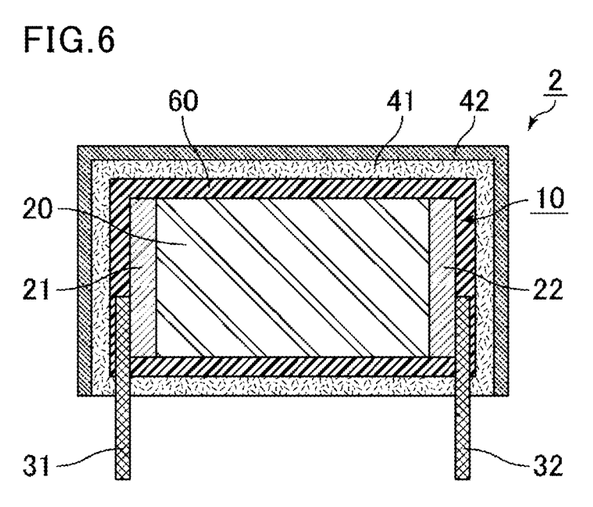
FIG. 6 is a schematic cross-sectional view of an example of a film capacitor according to a second embodiment of the present invention.

In the first embodiment of the present invention, the exterior body of the film capacitor may be the exterior resin 40 covering the capacitor element 10 as shown in FIG. 1, or may be a resin case 42 including a filling resin 41 that fills the space between the resin case 42 and the capacitor element 10 as shown in FIG. 6 (described later).

For example, a thermosetting resin such as an epoxy resin, a silicone resin, or a urethane resin is used as a material of the exterior resin 40 or the filling resin 41. The curing agent for an epoxy resin may be an amine curing agent or an imidazole curing agent. The exterior resin 40 or the filling resin 41 may contain only resin, or may also contain a reinforcing agent in order to improve the strength. The reinforcing agent may be silica or alumina.

Examples of a material of the resin case 42 include resins such as polyphenylene sulfide (PPS) and liquid crystal polymers (LCP).

In the first embodiment of the present invention, as shown in FIG. 1, the cover is the wound film 50 wound around the outer surface of the capacitor element 10.

The wound film 50 is made of a thermoplastic resin such as polypropylene, polyethersulfone, polyetherimide, or polyarylate.

In the direction in which the dielectric resin films are laminated, preferably, the wound film has a thickness that is 0.5% or more of a thickness of the capacitor element. In the direction in which the dielectric resin films are laminated, preferably, the wound film has a thickness that is 5% or less of the thickness of the capacitor element.

One sheet of the wound film may have any thickness, but the thickness is preferably 10 μm to 30 μm.

The thickness of the wound film can be measured by an optical film thickness gauge.

Preferably, the wound film is roughened at least on one surface or has irregularities on both surfaces.

In this case, voids are likely to be present in some portions between the wound film and the exterior body or between the wound film and the capacitor element. This achieves an effect of alleviating thermal shock imparted between the capacitor element and the exterior body.

Figure 3:
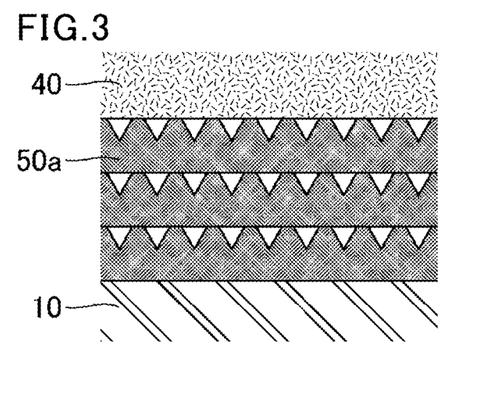
FIG. 3 is a schematic cross-sectional view of an example of a wound film.

FIG. 3 is a schematic cross-sectional view of an example of the wound film. FIG. 3 is an enlarged view of a portion surrounded by a dashed line in FIG. 1.

A wound film 50a shown in FIG. 3 is roughened only on one surface closer to the exterior resin 40.

When the wound film is roughened at least on one surface, as shown in FIG. 3, preferably, the wound film is roughened only on one surface closer to the exterior body. However, the wound film may be roughened only on one surface closer to the capacitor element or may be roughened on both the surface closer to the exterior body and the surface closer to the capacitor element.

When the wound film is roughened at least on one surface, preferably, the roughened surface of the wound film has a surface roughness Ra of 0.05 μm or more, in order to achieve the effect of alleviating thermal shock imparted between the capacitor element and the exterior body. Preferably, the roughened surface of the wound film has a surface roughness Ra of 0.3 μm or less.

The surface roughness Ra is the arithmetic mean roughness Ra defined in JIS B 0601:2013. The surface roughness Ra can be measured by a non-contact laser surface roughness meter (e.g., VK-X210 available from Keyence Corporation).

Figure 4:
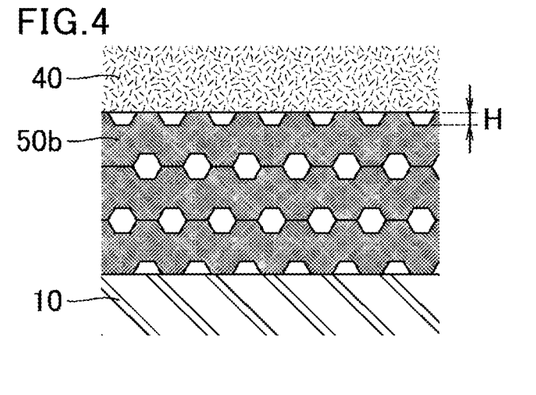
FIG. 4 is a schematic cross-sectional view of another example of the wound film.

FIG. 4 is a schematic cross-sectional view of another example of the wound film. FIG. 4 is an enlarged view of the portion surrounded by the dashed line in FIG. 1.

A wound film 50b shown in FIG. 4 has irregularities on both surfaces, with protrusions on one surface (e.g., the surface closer to the exterior resin 40) being provided at corresponding positions of recesses in the other surface (e.g., the surface closer to the capacitor element 10).

When the wound film has irregularities on both surfaces, as shown in FIG. 4, preferably, protrusions on one surface are provided at corresponding positions of recesses in the other surface, but the irregularities on both surfaces are not limited in terms of shape, size, arrangement, or the like.

When the wound film has irregularities on both surfaces, preferably, the protrusions of the irregularities each have a height of 0.01 mm or more, in order to achieve the effect of alleviating thermal shock imparted between the capacitor element and the exterior body. Preferably, the protrusions of the irregularities each have a height of 0.1 mm or less.

The height of each protrusion is the length indicated by H in FIG. 4.

When the wound film has irregularities on both surfaces, preferably 10 to 50, more preferably 15 to 30, protrusions are provided per 1 $cm^2$ on the surfaces of the wound film.

Figure 5:
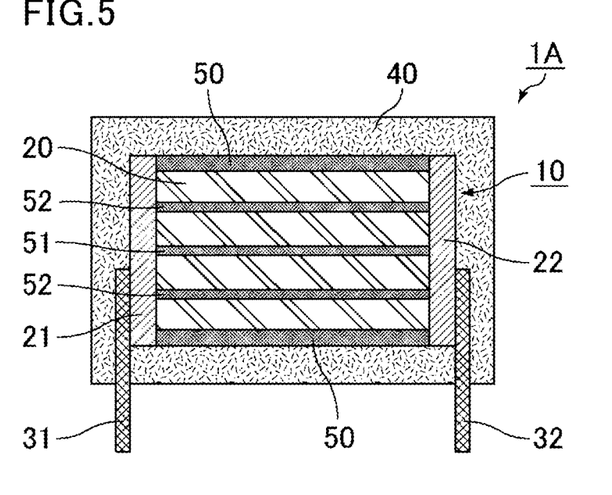
FIG. 5 is a schematic cross-sectional view of another example of the film capacitor according to the first embodiment of the present invention.

FIG. 5 is a schematic cross-sectional view of another example of the film capacitor according to the first embodiment of the present invention.

A film capacitor 1A shown in FIG. 5 includes not only the wound film 50 at an outermost peripheral portion of the capacitor element 10 but also a wound film 51 at an innermost peripheral portion of the capacitor element 10, and further includes a wound film 52 in a middle portion between the innermost peripheral portion and the outermost peripheral portion.

The film capacitor according to the first embodiment of the present invention may include another wound film at the innermost peripheral portion in addition to the one at the outermost peripheral portion of the capacitor element. As shown in FIG. 5, the film capacitor according to the first embodiment of the present invention may include still another wound film at the middle portion between the innermost peripheral portion and the outermost peripheral portion of the capacitor element in addition to the ones at the outermost peripheral portion and the innermost peripheral portion of the capacitor element.

Examples that more specifically disclose the first embodiment of the present invention are described below. The first embodiment of the present invention is not limited to these examples.

Example 1

A mixture of polyvinyl acetal and a polyisocyanate was cured to prepare a dielectric resin film made of a thermosetting resin. Aluminum was vapor deposited as an electrode on the dielectric resin film to provide a metallized film. Such metallized films were wound into a capacitor element. A polypropylene (hereinafter "PP", thermoplastic resin) film having a surface roughness Ra of 0.01 μm, 0.05 μm, or 0.3 μm on one surface was wound around an outermost peripheral portion of the resulting capacitor element (see FIG. 3). The PP film was wound to have a thickness that is 0.5% of the thickness of the wound body of the metallized films.

Zinc was thermally sprayed to both end surfaces of the capacitor element to lead out the electrode, and a lead was welded to each extraction electrode. Subsequently, the capacitor element was covered with an epoxy resin, whereby a film capacitor of Example 1 was produced (see FIG. 1).

As a comparative example, another film capacitor was produced without winding a PP film around an outermost peripheral portion of a capacitor element including metallized films in a wound state (see FIG. 7).

Each film capacitor was placed in a −40° C. test tank and a 125° C. test tank to be alternately exposed to different temperature 1000 times for a thermal shock test to check deterioration of electrical characteristics.

The film capacitor of the comparative example showed an increase in the ratio of the ESR before and after the thermal shock test to 135% on average. In contrast, the film capacitors of Example 1 showed a ratio of the ESR before and after the test of 107% on average (one with the PP film having an Ra of 0.05 μm) and 103% on average (one with the PP film having an Ra of 0.3 μm). The ESR hardly increased after the test. The film capacitor with the PP film having an Ra of 0.01 μm had a ratio of the ESR before and after the thermal shock test of 122% on average. While the ESR increased after the test, the film capacitor suppressed the increase in the ESR as compared to the film capacitor of the comparative example.

The increase in the ESR was suppressed in Example 1, presumably because the cover by the PP film wound around the outermost peripheral portion of the capacitor element alleviated thermal expansion stress between the capacitor element and the exterior body and thermal shock from rapid temperature changes, owing to a combination of the low elastic modulus and softness of the PP film at high temperatures and the surface roughness of the PP film. From the results of Example 1, a preferred surface roughness Ra is considered to be 0.05 μm or more.

Example 2

A mixture of polyvinyl acetal and a polyisocyanate was cured to prepare a dielectric resin film made of a thermosetting resin. Aluminum was vapor deposited as an electrode on the dielectric resin film to provide a metallized film. Such metallized films were wound into a capacitor element. A PP (thermoplastic resin) film having its surface embossed to have irregularities with 25 protrusions of a height of 0.01 mm or 0.1 mm per 1 cm$^2$ was wound around an outermost peripheral portion of the resulting capacitor element (see FIG. 4). The PP film was wound to have the same thickness as in Example 1.

As in Example 1, a film capacitor was produced, and a thermal shock test was performed.

Each film capacitor of Example 2 had a ratio of the ESR before and after the thermal shock test of 102% on average. The ESR hardly increased after the test.

The increase in ESR was suppressed in Example 2, presumably because the cover by the PP film wound around the outermost peripheral portion of the capacitor element alleviated thermal expansion stress between the capacitor element and the exterior body and thermal shock from rapid temperature changes as in Example 1. From the results of Example 2, a height of 0.01 mm is considered to be sufficient for the protrusions.

Example 3

A mixture of polyvinyl acetal and a polyisocyanate was cured to prepare a dielectric resin film made of a thermosetting resin. Aluminum was vapor deposited as an electrode on the dielectric resin film to provide a metallized film. Such metallized films were wound into a capacitor element. In one structure, PP (thermoplastic resin) films having a surface roughness Ra of 0.3 μm on one surface were wound around an innermost peripheral portion and an outermost peripheral portion of the resulting capacitor element. In another structure, the PP films were wound not only around the innermost peripheral portion and the outermost peripheral portion of the capacitor element but also around a middle portion between the innermost peripheral portion and the outermost peripheral portion (see FIG. 5). The PP film at the outermost peripheral portion was wound to have a thickness that is 0.5% of the thickness of the wound body of the metallized films.

As in Example 1, a film capacitor was produced, and a thermal shock test was performed.

The film capacitors of Example 3 had a ratio of the ESR before and after the thermal shock test of 102% on average (one with the PP films wound around the innermost peripheral portion and the outermost peripheral portion) and 104% on average (one with the additional PP film wound around the middle portion). The ESR hardly increased to a similar degree as in Example 1 in which the PP film was wound around only the outermost peripheral portion.

The increase in the ESR was suppressed in Example 3, presumably because the effect of alleviating thermal expansion stress between the capacitor element and the exterior body and thermal shock from rapid temperature changes can be achieved to a similar degree as in Example 1, even when the PP films are wound not only around the outermost peripheral portion of the capacitor element but also around the innermost peripheral portion and the middle portion of the capacitor element.

Second Embodiment

In a film capacitor according to a second embodiment of the present invention, a cover is a coating on an outer surface of a capacitor element.

FIG. 6 is a schematic cross-sectional view of an example of the film capacitor according to the second embodiment of the present invention.

A film capacitor 2 shown in FIG. 6 includes the capacitor element 10. The capacitor element 10 includes the wound body 20 of metallized films, and the first external electrode 21 and the second external electrode 22 on both sides of the wound body 20. As in the film capacitor 1 shown in FIG. 1, the wound body 20 includes a first metallized film including a first dielectric resin film and a first metal layer on one surface of the first dielectric resin film and a second metallized film including a second dielectric resin film and a second metal layer on one surface of the second dielectric resin film, and the first metallized film and the second metallized film are wound in a laminated state. The first lead 31 is electrically connected to the first external electrode 21, and the second lead 32 is electrically connected to the second external electrode 22.

The film capacitor 2 shown in FIG. 6 further includes a coating 60 that is an example of the cover, and the resin case 42 including the filling resin 41 that is an example of the exterior body. The coating 60 is provided on an outer surface of the capacitor element 10, and covers the outer surface of the capacitor element 10 in a direction in which the dielectric resin films are laminated with a metal layer therebetween. The resin case 42 including the filling resin 41 that fills the space between the resin case 42 and the capacitor element 10 covers the outer periphery of the capacitor element 10 including an outer surface of the coating 60.

In the second embodiment of the present invention, the exterior body of the film capacitor may be the resin case 42 including the filling resin 41 that fills the space between the resin case 42 and the capacitor element 10 as shown in FIG. 6, or may be the exterior resin 40 covering the capacitor element 10 as shown in FIG. 1 described above.

In the second embodiment of the present invention, the cover is the coating 60 on the outer surface of the capacitor element 10 as shown in FIG. 6.

The coating 60 is made of a thermoplastic resin such as polycarbonate or polyarylate.

In the direction in which the dielectric resin films are laminated, preferably, the coating has a thickness that is 0.5% or more of a thickness of the capacitor element. In the direction in which the dielectric resin films are laminated, preferably, the coating has a thickness that is 5% or less of the thickness of the capacitor element.

Preferably, the coating has air bubbles contained therein.

In this case, it is possible to achieve the effect of alleviating thermal shock imparted between the capacitor element and the exterior body, as in the case of the wound film having a roughened surface or the wound film having irregularities.

The presence of air bubbles inside the coating can be confirmed by observing a cross-section using a scanning electron microscope (SEM) or the like.

Other features are the same as those of the first embodiment of the present invention.

Examples that more specifically disclose the second embodiment of the present invention are described below. The second embodiment of the present invention is not limited to these examples.

Example 4

A mixture of polyvinyl acetal and a polyisocyanate was cured to prepare a dielectric resin film made of a thermosetting resin. Aluminum was vapor deposited as an electrode on the dielectric resin film to provide a metallized film. Such metallized films were wound into a capacitor element. Zinc was thermally sprayed to both end surfaces of the resulting capacitor element to lead out the electrode, and a lead was welded to each extraction electrode. Subsequently, the capacitor element was immersed in a polycarbonate (thermoplastic resin) solution in tetrahydrofuran and the solvent was removed, whereby a coating was formed. The coating had a thickness that is 0.5% of the thickness of the wound body of the metallized films. Then, the capacitor element was covered with a PPS resin case filled with an epoxy resin, whereby a film capacitor of Example 4 was produced (see FIG. 6).

As in Example 1, a thermal shock test was performed on the film capacitor.

The film capacitor of Example 4 had a ratio of the ESR before and after the thermal shock test of 105% on average. The ESR only slightly increased after the test.

The increase in the ESR was suppressed in Example 4, presumably because an effect similar to the effect achieved by winding the PP film around the outermost peripheral portion of the capacitor element was obtained by providing the coating of polycarbonate (thermoplastic resin) on the capacitor element including the dielectric resin films made of a thermosetting resin.

The similar effect as in Example 1 was achieved although the surface of the coating was not roughened, presumably because fine air bubbles, which are often present in the coating formed by immersing the capacitor element in the thermoplastic resin solution and removing the solvent, reduced the elastic modulus and the heat transfer speed, contributing to the achievement of the effect. Thus, a method such as removing the solvent under heat after immersion or adding a foaming agent is considered to be also effective to enhance the effect by the air bubbles.

Other Embodiments

The film capacitor of the present invention reduces thermal expansion stress between the capacitor element and the exterior body or interferes with heat transfer between the capacitor element and the exterior body, whereby the film capacitor alleviates thermal shock, and thus suppresses the increase in the ESR.

Thus, a film capacitor having the following features is also encompassed by the film capacitor of the present invention.

A film capacitor according to a third embodiment of the present invention includes a capacitor element including one or more wound or laminated metallized films, each metallized film including a dielectric resin film and a metal layer on one surface of the dielectric resin film; a cover covering an outer surface of the capacitor element in a direction in which layers of the dielectric resin film are laminated with the metal layer therebetween; and an exterior body covering an outer periphery of the capacitor element including an outer surface of the cover, wherein the cover has an elastic modulus at 25° C. of 30% to 150% of an elastic modulus of the dielectric resin film at 25° C., and the cover has an elastic modulus at 125° C. of 1% to 30% of an elastic modulus of the dielectric resin film at 125° C.

In the film capacitor according to the third embodiment of the present invention, the cover has an elastic modulus at 125° C. of preferably 10% or less, more preferably 5% or less, of an elastic modulus of the dielectric resin film at 125° C.

The elastic modulus at 25° C. or 125° C. means the storage elastic modulus measured by a dynamic mechanical analysis (DMA) device.

A film capacitor according to a fourth embodiment of the present invention includes a capacitor element including one or more wound or laminated metallized films, each metallized film including a dielectric resin film and a metal layer on one surface of the dielectric resin film; a cover covering an outer surface of the capacitor element in a direction in which layers of the dielectric resin film are laminated with the metal layer therebetween; and an exterior body covering an outer periphery of the capacitor element including an outer surface of the cover, wherein the cover is a wound film that is a film wound around the outer surface of the capacitor element, and the wound film is roughened at least on one surface or has irregularities on both surfaces.

Preferably, in the film capacitor according to the fourth embodiment of the present invention, voids are present in some portions between the wound film and the exterior body or between the wound film and the capacitor element.

A film capacitor according to a fifth embodiment of the present invention includes a capacitor element including one or more wound or laminated metallized films, each metallized film including a dielectric resin film and a metal layer on one surface of the dielectric resin film; a cover covering an outer surface of the capacitor element in a direction in which layers of the dielectric resin film are laminated with the metal layer therebetween; and an exterior body covering an outer periphery of the capacitor element including an outer surface of the cover, wherein the cover is a coating on the outer surface of the capacitor element, and the coating has air bubbles contained therein.

In the film capacitors according to the third, fourth, and fifth embodiments of the present invention, the dielectric resin film may contain a curable resin such as a thermosetting resin as a main component thereof or may contain a thermoplastic resin as a main component thereof. The cover may be made of a thermoplastic resin or may be made of a curable resin such as a thermosetting resin. In particular, the dielectric resin film preferably contains a curable resin as a main component thereof, and the cover is preferably made of a thermoplastic resin.

The film capacitor of the present invention is not limited to the above embodiments and examples. Various modifications and changes can be made to the structure, production conditions, and the like of the film capacitor without departing from the spirit of the invention.

REFERENCE SIGNS LIST 1, 1A, 2, 100 film capacitor
10 capacitor element
11 first metallized film
12 second metallized film
13 first dielectric resin film
14 second dielectric resin film
15 first metal layer
16 second metal layer
20 wound body of metallized films
21 first external electrode
22 second external electrode
31 first lead
32 second lead
40 exterior resin (exterior body)
41 filling resin (exterior body)
42 resin case (exterior body)
50, 50a, 50b wound film (cover)
51, 52 wound film
60 coating (cover)

The invention claimed is:

1. A film capacitor comprising:
a capacitor element including one or more wound or laminated metallized films, each metallized film including a dielectric resin film and a metal layer on one surface of the dielectric resin film, wherein the dielectric resin film contains a curable resin as a main component thereof;
a thermoplastic resin cover covering an outer surface of the capacitor element in a direction in which layers of the dielectric resin film are laminated with the metal layer therebetween; and
an exterior body covering an outer periphery of the capacitor element and an outer surface of the cover, wherein
the thermoplastic resin cover is a wound film that is wound around the outer surface of the capacitor element, and
the wound film has at least one surface that is a roughened surface.

2. The film capacitor according to claim 1, wherein in the direction in which the layers of the dielectric resin film are laminated, the thermoplastic resin cover has a thickness that is 0.5% to 5% of a thickness of the capacitor element.

3. The film capacitor according to claim 1, wherein the wound film has only one roughened surface, and the only one roughened surface is closer to the exterior body than the capacitor element.

4. The film capacitor according to claim 1, wherein the roughened surface has a surface roughness Ra of 0.05 μm to 0.3 μm.

5. A film capacitor comprising:
a capacitor element including one or more wound or laminated metallized films, each metallized film including a dielectric resin film and a metal layer on one surface of the dielectric resin film, wherein the dielectric resin film contains a curable resin as a main component thereof;
a thermoplastic resin cover covering an outer surface of the capacitor element in a direction in which layers of the dielectric resin film are laminated with the metal layer therebetween; and
an exterior body covering an outer periphery of the capacitor element and an outer surface of the cover, wherein
the thermoplastic resin cover is a wound film that is wound around the outer surface of the capacitor element,
the wound film has irregularities on opposed surfaces thereof, and
protrusions of the irregularities each have a height of 0.01 mm to 0.1 mm.

6. The film capacitor according to claim 5, wherein the irregularities include protrusions on a first of the opposed surfaces and recesses on a second of the opposed surfaces, the protrusions being positioned at corresponding positions of the recesses.

7. A film capacitor comprising:
a capacitor element including one or more wound or laminated metallized films, each metallized film including a dielectric resin film and a metal layer on one surface of the dielectric resin film;
a cover covering an outer surface of the capacitor element in a direction in which layers of the dielectric resin film are laminated with the metal layer therebetween; and
an exterior body covering an outer periphery of the capacitor element and an outer surface of the cover,
wherein the cover has an elastic modulus, and the elastic modulus of the cover at 25° C. is 30% to 150% of an elastic modulus of the dielectric resin film at 25° C., and
the elastic modulus of the cover at 125° C. is 1% to 30% of the elastic modulus of the dielectric resin film at 125° C.

8. The film capacitor according to claim 7, wherein the cover is a wound film that is wound around the outer surface of the capacitor element.

9. The film capacitor according to claim 7, wherein the cover is a coating on the outer surface of the capacitor element.

10. The film capacitor according to claim 8, wherein the wound film has at least one surface that is a roughened surface.

11. The film capacitor according to claim 8, wherein the wound film has irregularities on opposed surfaces thereof.

12. The film capacitor according to claim 9, wherein the coating includes air bubbles therein.

13. The film capacitor according to claim 10, wherein the wound film has only one roughened surface, and the only one roughened surface is closer to the exterior body than the capacitor element.

14. The film capacitor according to claim 10, wherein the roughened surface has a surface roughness Ra of 0.05 μm to 0.3 μm.

15. The film capacitor according to claim 11, wherein the irregularities include protrusions on a first of the opposed surfaces and recesses on a second of the opposed surfaces, the protrusions being positioned at corresponding positions of the recesses.

16. The film capacitor according to claim 11, wherein protrusions of the irregularities each have a height of 0.01 mm to 0.1 mm.

17. The film capacitor according to claim 7,
wherein the dielectric resin film contains a curable resin as a main component thereof, and
the cover is made of a thermoplastic resin.

18. The film capacitor according to claim 7, wherein in the direction in which the layers of the dielectric resin film are laminated, the cover has a thickness that is 0.5% to 5% of a thickness of the capacitor element.

19. A film capacitor comprising:
a capacitor element including one or more wound or laminated metallized films, each metallized film including a dielectric resin film and a metal layer on one surface of the dielectric resin film;
a cover comprising a wound film wound around an outer surface of the capacitor element in a direction in which layers of the dielectric resin film are laminated with the metal layer therebetween, and the wound film has at least one surface that is a roughened surface or has irregularities on opposed surfaces thereof; and
an exterior body covering an outer periphery of the capacitor element and an outer surface of the cover,
wherein the wound film has only on one roughened surface, and the only one roughened surface is closer to the exterior body than the capacitor element.

20. The film capacitor according to claim 19, wherein voids are present in at least a portion between the wound film and the exterior body or between the wound film and the capacitor element.

21. The film capacitor according to claim 16, wherein the roughened surface has a surface roughness Ra of 0.05 µm to 0.3 µm.

22. The film capacitor according to claim 19,
wherein the dielectric resin film contains a curable resin as a main component thereof, and
the cover is made of a thermoplastic resin.

23. The film capacitor according to claim 19, wherein in the direction in which the layers of the dielectric resin film are laminated, the cover has a thickness that is 0.5% to 5% of a thickness of the capacitor element.

24. A film capacitor comprising:
a capacitor element including one or more wound or laminated metallized films, each metallized film including a dielectric resin film and a metal layer on one surface of the dielectric resin film;
a cover comprising a wound film wound around an outer surface of the capacitor element in a direction in which layers of the dielectric resin film are laminated with the metal layer therebetween, and the wound film has at least one surface that is a roughened surface or has irregularities on opposed surfaces thereof; and
an exterior body covering an outer periphery of the capacitor element and an outer surface of the cover,
wherein protrusions of the irregularities each have a height of 0.01 mm to 0.1 mm.

25. The film capacitor according to claim 24, wherein the irregularities include protrusions on a first of the opposed surfaces and recesses on a second of the opposed surfaces, the protrusions being positioned at corresponding positions of the recesses.

* * * * *